United States Patent [19]
Dürr et al.

[11] Patent Number: 5,644,846
[45] Date of Patent: Jul. 8, 1997

[54] RECIPROCATING STROKE DRIVE MECHANISM FOR JIGSAWS

[75] Inventors: Paul Dürr, Ulisbach; Armin Breitenmoser, Wattwil, both of Switzerland

[73] Assignee: CEKA Elektrowerkzeuge AG & Co. KG, Wattwil, Switzerland

[21] Appl. No.: 572,031

[22] Filed: Dec. 14, 1995

[30] Foreign Application Priority Data

Dec. 16, 1994 [EP] European Pat. Off. ............. 94119920

[51] Int. Cl.$^6$ ............................................... B27B 11/02
[52] U.S. Cl. ..................................... 30/393; 74/50
[58] Field of Search ........................ 30/392, 393, 394; 74/25, 27, 53

[56] References Cited

U.S. PATENT DOCUMENTS

| | | | |
|---|---|---|---|
| 2,781,800 | 2/1957 | Papworth | 30/393 |
| 4,238,884 | 12/1980 | Walton, II | 30/393 |
| 4,262,421 | 4/1981 | Bergler et al. | 30/393 |
| 4,512,078 | 4/1985 | Pfanzer | 30/393 |
| 4,628,605 | 12/1986 | Clowers | 30/393 |

FOREIGN PATENT DOCUMENTS

| | | |
|---|---|---|
| 3118758 | 12/1982 | Germany . |
| 8702727 | 2/1987 | Germany . |
| 3702670 | 8/1988 | Germany . |

OTHER PUBLICATIONS

European Search Report (for EPO 94 11 9920) dated May 18, 1995.

*Primary Examiner*—Hwei-Siu Payer
*Attorney, Agent, or Firm*—Darby & Darby

[57] ABSTRACT

In order to improve a reciprocating stroke drive mechanism for sabre saws, with a slide (5), with a saw blade (2) which is fastened in a detachable manner to the slide (5), with a slide carrier (7) which forms a slide guide and which is supported in a rotatable manner, a connecting link (9) which is driven in an eccentric manner by a shaft (11) of a motor for the creating of the up and down movement of the slide (5), and with a reciprocating stroke arrangement in such a way that operation of the reciprocating stroke drive mechanism that is as reliable as possible is attained with as few moving parts as possible, it is suggested that the reciprocating stroke drive mechanism include the following: A balancing mass (13) which can be moved up and down vertically with the slide (5) and a pivoting fork (19) which is mounted in a rotatable manner underneath the balancing mass (13) and the first lever arm (18) of which lies against the saw blade (2), and on the second lever arm (20) of which there is configured a sliding surface (17) which is inclined to the horizontal and along which the balancing mass (13) slides for the creating of a horizontal reciprocating stroke movement of the saw blade (2) while exerting a downward-directed vertical pressure.

19 Claims, 2 Drawing Sheets

RECIPROCATING STROKE DRIVE MECHANISM FOR JIGSAWS

FIELD OF THE INVENTION

The invention pertains to a reciprocating stroke drive mechanism for jigsaws in accordance with the introductory clause of Patent Claim 1.

BACKGROUND OF THE INVENTION

In order to achieve the best possible sawing results with jigsaws, it has been known for a long time that the vertical up and down movement of the saw blade should simultaneously have superimposed on it a horizontal back and forth movement. With these so-called reciprocating stroke jigsaws, significantly better sawing performance can be achieved as a result of the improved chip removal, particularly in the case of greater material thicknesses.

For the creation of this reciprocating stroke movement, reciprocating stroke drive mechanisms are known which require a large number of moving parts. Thus, from DE 37 02 670 A1 a reciprocating stroke drive mechanism is known in which the stroke movement of the slide which holds the saw blade and which is guided in an upper and a lower beating is created by means of a Scotch-yoke mechanism. The upper bearing of the slide is placed along with the latter inside the saw housing in such a way that it can rotate, while the lower bearing of the slide is guided so that it can move both cross-wise, in the direction of the plane of the saw blade, as well as in a swivelling manner inside the saw housing. For the up and down movement, a guiding connecting link, which is a component of a stroke element, is actuated. In conjunction with that, the stroke element is guided in a sliding manner in a straight-line guide. The lower end of the stroke element acts on one arm of a bell-crank lever, which can rotate around a bearing that can be manually adjusted in the direction of the axis of the slide. The other arm of the bell-crank lever is tangent to the lower slide bearing, which can be displaced in a limited manner cross-wise to the longitudinal axis of the slide against the force of a spring. In this way, a cross-wise movement is superimposed on the slide which is moving up and down, so that the slide carries out a periodic reciprocating stroke movement.

What is disadvantageous about this type of reciprocating stroke drive mechanism is the fact that a very large number of moving parts are required. Thus, along with an upper slide bearing, it is also necessary to have a lower slide beating in which the slide is guided in sliding manner. The lower slide bearing is in turn guided in a complex manner, so that it can move both cross-wise in the direction of the plane of the saw blade as well as in a swiveling manner inside the saw housing. Finally, the stroke element for the actuating of the bell-crank lever also has to be guided in a straight-line guide in a sliding manner. As a result of the large number of moving parts and, in particular, the large number of bearing arrangements, the entire assembly is prone to failure, difficult to manufacture and assemble, and thus expensive as well.

The task of the present invention is to eliminate the mentioned disadvantages, and to further develop a reciprocating stroke drive mechanism for jigsaws in such a way that, using as few moving parts, beatings, etc. as possible, an optimal reciprocating stroke movement of the saw blade is created, which means one that works in a trouble-free manner and is simple to create.

SUMMARY OF THE INVENTION

Using a reciprocating stroke drive mechanism for jigsaws that has the features of the introductory clause of Patent Claim 1, this task is carried out in accordance with the invention by means of the features of the characterizing section of Patent Claim 1.

It is particularly advantageous, to have balancing mass, which moves up and down vertically in order to balance the mass of the slide that is moving up and down, create with it's vertical movement a horizontal reciprocating stroke movement of the saw blade by means of the pivoting fork which is supported underneath the balancing mass. That way, in essence only two moving parts are necessary for the creation of the reciprocating stroke, one of which, the balancing mass, is at the same time used for a second purpose, namely, the balancing of the mass of the slide which is moving up and down.

Additional advantageous developments of the invention are the subjects of the subordinate claims.

By way of example, it is advantageous that for the modification of the reciprocating stroke of the saw blade, there is provided in the pivoting fork a recess, against which a limit stop for restricting of the rotating movement of the pivoting fork comes to rest either partially or completely.

The eccentrically supported limit stop is in turn connected to a rotatable knob that is located on the housing of the reciprocating saw, so that an operator of the jigsaw can carry out a step-by-step or continuous adjustment of the reciprocating stroke by turning the knob.

It is preferable that the balancing mass be guided in a sliding manner in a carrier plate that is rigidly fastened to the jigsaw housing. As a result of this, not only is the stability of the entire reciprocating stroke drive mechanism increased, but in addition, a secure mounting of the balancing mass is assured as well.

In order to reduce friction, it is advantageous to fasten on one of the lever arms of the pivoting fork a support roller which comes to rest against the saw blade. In addition, in order to reduce friction at the lower end of the balancing mass as well, there are placed two opposed needle rollers which are mounted so they can rotate, one of which rolls on a sliding surface of the pivoting fork and the other of which rolls on a vertical guide surface that is rigidly fastened inside the jigsaw housing.

It is preferably that the slide carrier be a molded plastic part so that it exhibits only a very small moving mass.

It can also be advantageous that, along with the above-mentioned adjustment possibility for the reciprocating stroke, for the switching off of the reciprocating stroke, one sliding surface of the pivoting fork exhibits an opening through which the balancing mass can move unhindered when the pivoting fork is in its rest position, and as a result of which no rotating movement of the pivoting fork can be created.

The following description of preferred forms of implementation of the invention is used, in conjunction with the attached drawing, to explain the invention in more detail.

DETAILED DESCRIPTION OF THE INVENTION

Figure 1:
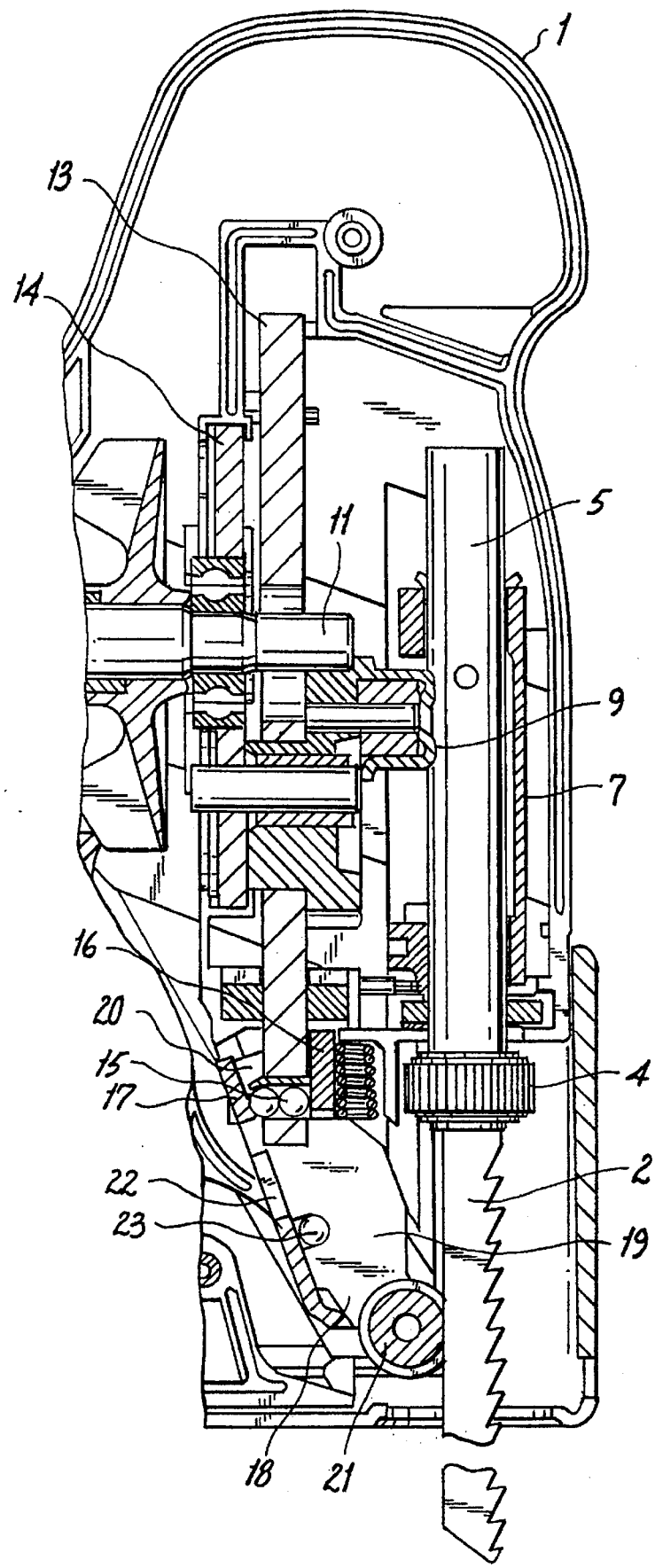
FIG. 1 A partially cross-sectioned representation of a reciprocating stroke drive mechanism that is mounted inside a jigsaw housing.

As can be seen from FIG. 1, a reciprocating stroke drive mechanism that is located in the front part of a jigsaw housing 1 is in essence comprised of a slide 5 to which there is fastened in a detachable manner, by means of a quick-action clamping system 4, a jigsaw blade 2. The slide 5 is guided in a slide carrier 7 in such a way that it can slide.

The slide carrier 7, which is preferably comprised of a molded plastic part so that it exhibits only a small moving mass itself, is rotatably supported inside the jigsaw housing 1.

In order to create the up and down movement of the slide 5, a connecting link 9 that is driven in an eccentric manner by a shaft 11 of a drive motor engages with the slide 5 in a manner that is known per se.

A balancing mass 13 is provided as a mass balance for the slide 5 which is moving up and down and for the saw blade 2 that is fastened to it. It is preferable that the balancing mass 13 exhibits the shape of a thick disk, which, in order to ensure a secure mounting, is guided in a sliding manner on a carrier plate 14 that is fastened inside the jigsaw housing 1. There are recesses in the disk for the driving mechanism for the slide and for the fastening of the balancing mass 13.

The balancing mass 13 is not only used to balance the mass of the slide 5 which is moving up and down and the saw blade 2 that is fastened to it, it is also a part of a reciprocating stroke facility for the creation of a reciprocating stroke by the saw blade 2. For this purpose, there is placed underneath the balancing mass 13 a rotatably mounted pivoting fork 19, which includes two lever arms of approximately the same length, 18, 20, the first lever arm 18 of which lies against the saw blade 2, and on the second lever arm 20 of which there is formed a sliding surface 17 which is inclined to the horizontal and against which the lower part of the balancing mass 13 comes to rest.

In order to reduce the friction of the saw blade 2 that slides along the first lever arm 18, there is fastened to the lever arm 18 a support roller 21, which carries out a rolling movement on the saw blade 2 which is moving up and down, while a pressure that acts in the horizontal direction is exerted on the saw blade 2 by the lever arm 18. In addition, in order to reduce friction on the lower end of the balancing mass 13, there are placed two opposed needle rollers 15 which are mounted so they can rotate, one of which robs on the sliding surface 17, and the other of which rolls on a vertical guide surface 16 that is, for example, fastened inside the jigsaw housing 1.

The creation of the reciprocating stroke now proceeds as follows. Along with the slide 5, which is moving vertically up and down by means of the eccentrically driven connecting link 9, and the saw blade 2 that is fastened to the slide, the balancing mass 13 is also moving up and down. As this is taking place, the balancing mass 13 exerts a vertical, downward-directed pressure on the second lever arm 20 of the pivoting fork 19 by means of the needle roller 15 on the sliding surface 17 that is formed on the pivoting fork 19 and that is inclined towards the horizontal. This vertical, downward-directed pressure is converted by the pivoting fork 19 into a sideways-directed horizontal pressure, and is transmitted to the saw blade 2 by the first lever arm 18 and the support roller 21 that is fastened to it. As a result of this, a cross-wise movement is superimposed on the saw blade 2 which is moving up and down, so that it carries out a periodic reciprocating stroke movement.

As can be seen from FIGS. 2 through 5, the pivoting fork 19 can also be designed in such a way that the reciprocating stroke can be adjusted step-by-step or continuously.

Figure 2:
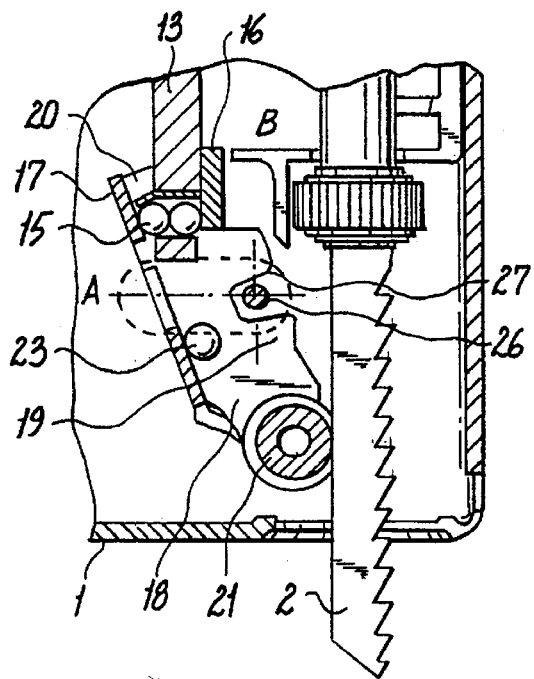
FIG. 2 A partially broken out, cross-sectioned representation of a reciprocating stroke drive mechanism with an adjustable reciprocating stroke with a latched pivoting fork.
Figure 3:
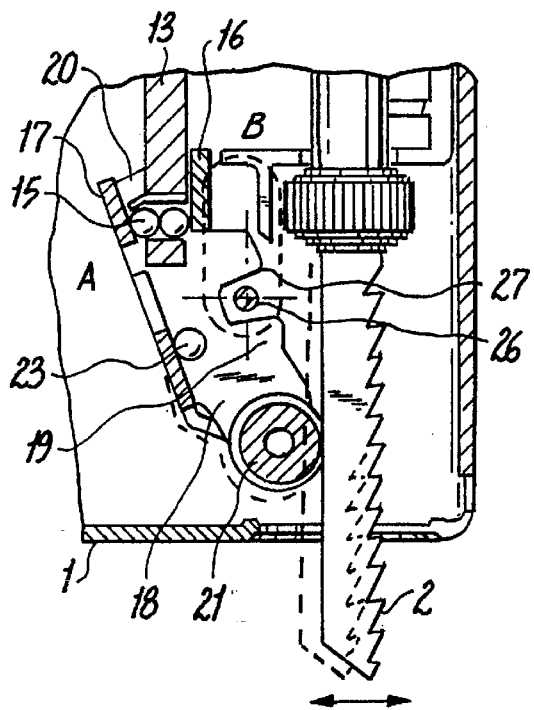
FIG. 3 A partially broken out, cross-sectioned top view of the reciprocating stroke drive mechanism shown in FIG. 2.

Shown in FIG. 2 schematically, partially broken out and in cross-section, is the representation of a reciprocating stroke drive mechanism with an adjustable reciprocating stroke, in which the pivoting fork 19 is latched so that the saw blade 2 does not reciprocate. As is shown in FIG. 3, placed for this purpose on the housing 1 is a rotating knob 25 which is provided, by way of example, with latching means 24, and which is connected to an eccentrically mounted limit stop 26. In the pivoting fork 19 there is provided a recess 27, within which the eccentric limit stop 26 is placed. In a setting of the knob 25 that is identified by an A (FIG. 2, FIG. 4), the eccentric limit stop 26 now comes to rest against an area of the recess 27 in the pivoting fork 19, so that the pivoting fork is fixed in place on the one end by the bearing arrangement at its point of rotation 23, and on the other end by the eccentric limit stop 26 which comes to rest against the recess 27 in this position, which is shown in FIG. 2. If in this case the balancing mass 13 moves upwards, in the way described above, from its lowest possible position, which is shown in FIG. 2, then, in the course of the upward movement of the balancing mass 13, the two needle rollers 15 no longer touch the surface 17, since the pivoting fork 19 and, along with it, the surface 17, as a result of their latched position are no longer able to follow the upward-moving balancing mass 13 by means of a rotating movement, and as a result, no reciprocating stroke of the same blade 2 can be created either.

Figure 4:
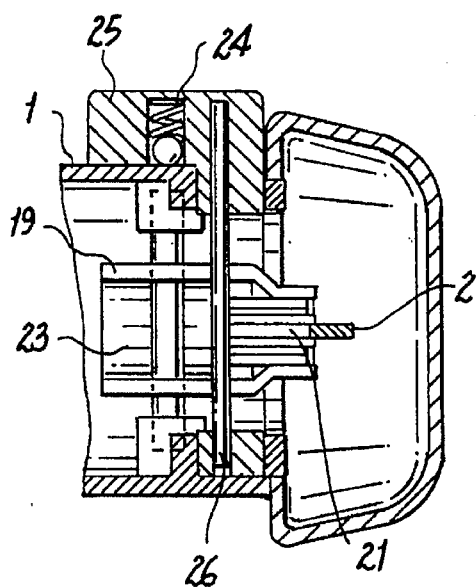
FIG. 4 A partially broken out, cross-sectioned representation of the reciprocating stroke drive mechanism shown in FIG. 2, with a pivoting fork which can rotate freely and which allows the maximum possible reciprocating stroke.
Figure 5:
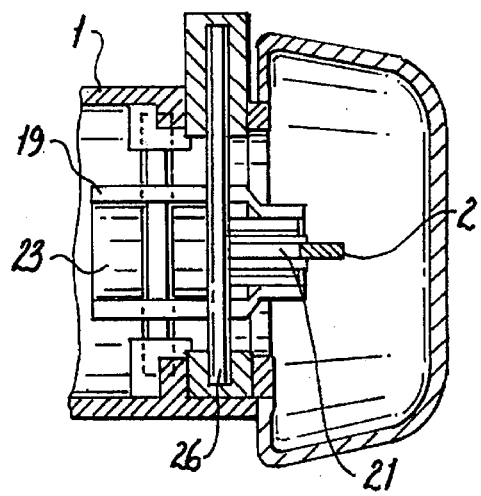
FIG. 5 A partially broken out, cross-sectioned top view of the reciprocating stroke drive mechanism shown in FIG. 4.

By way of contrast, in FIGS. 4 and 5 an additional setting B of the knob 25 and the pivoting fork 19 is shown, in which the eccentric limit stop 26 is placed in the recess 27 of the pivoting fork 19 in such a way that it does not touch any of the surfaces of the recess 27 which surround it. In this case, the pivoting fork 19 can rotate freely around its point of rotation 23. As a result, in the event of an up and down movement of the balancing mass 13, the pivoting fork 19 can follow the balancing mass 13 by means of an appropriate rotating movement, and as a result, the surface 17 is always lying against one of the needle rollers 15. In this case, in the form of implementation that is shown in FIG. 4, when there is an upward movement of the balancing mass 13, a rotating of the pivoting fork 19 takes place in the clockwise direction, and when there is a downward movement of the balancing mass 13, a rotating of the pivoting fork 19 takes place in the counter-clockwise direction, and as a result of that, a reciprocating stroke movement of the saw blade 2 occurs in the way described above. This is indicated schematically in FIG. 4 by means of a double arrow underneath the saw blade 2 and by two saw blade positions (one of which is shown by dashed lines).

It is understood, of course, that between these two extreme positions of setting A of the knob 25 and setting B of the knob 25, additional settings of the pivoting fork 19 are possible, which partially restrict the reciprocating stroke movement. In this regard, the knob 25, and with it the eccentric limit stop 26, can either be fixed in place in various latched settings by means of a latching means 24 (FIG. 3), or a continuous adjusting movement of the knob 25 and the eccentric limit stop 26 is possible. In this way, either various individual reciprocating stroke lengths can be set, or the reciprocating stroke length can be continuously varied.

In addition to that, along with the form of implementation represented above for shutting off the reciprocating stroke movement, there can also be provided in the sliding surface 17 of the pivoting fork 19 an opening 22, through which the balancing mass 13 can pass unhindered, along with the needle rollers 15 that are fastened to it, when the pivoting fork 19 is in its rest position. For this purpose, in the form of implementation shown in FIG. 1 the pivoting fork 19 is rotated in the counter-clockwise direction, so that the balancing mass 13 is no longer tangent to the sliding surface 17, but rather, can be moved through the opening 22 instead.

With respect to the previously known reciprocating stroke drive mechanisms, the reciprocating stroke arrangement shown has the advantage that it is in essence comprised of only two moving parts, namely, the balancing mass 13 and the pivoting fork 19. In addition to this, along with the creating of the reciprocating stroke, the balancing mass 13 is also given the function of balancing the mass of the slide 5, which is moving up and down, and the saw blade 2 that is fastened to the slide. Thus, the reciprocating stroke drive mechanism is first of all simple and inexpensive to manufacture, and second, because of the small number of moving parts, it is also assures more reliable operation.

We claim:

1. In combination with a saw of the type having housing, a slide, a saw blade selectively fastened to said slide, a motor having a shaft, and a connecting link which is driven eccentrically by the shaft for vertically reciprocating the slide, a reciprocating stroke drive mechanism comprising:

a balancing mass which is slidable with the slide; and a pivotally mounted fork having a first arm and a second arm, the first arm contacting the saw blade, the second arm including a slide surface which is inclined relative to the horizontal along which the balancing mass slides for horizontally reciprocating the saw blade while exerting a downward-directed vertical pressure.

2. The combination as in claim 1, wherein the pivot axis of the pivotally mounted fork is located at a location such that the first arm and the second arm have the same length.

3. The combination as in claim 1, wherein the fork has a recess, the reciprocating stroke drive mechanism further comprising a stop mounted eccentrically relative to the recess so that pivotal motion of the fork is restricted by contact with the stop.

4. The combination as in claim 3, further comprising a knob connected to the stop, the knob being for adjusting the stop and thereby setting the reciprocating stroke length of the saw blade.

5. The combination as in claim 1, wherein the fork has a rest position and the second arm of the fork has an opening in the slide surface, the balancing mass passing unhindered through the opening when the fork is in the rest position, whereby there is no horizontal reciprocation of the saw blade.

6. The combination as in claim 1, wherein the housing has a carrier plate rigidly fastened thereto and wherein the balancing mass is slidably guided within the housing along the carrier plate.

7. The combination as in claim 1, wherein the first arm has a support roller which rests against the saw blade of the saw.

8. The combination as in claim 1, wherein the balancing mass includes a first roller arranged to roll on the inclined slide surface.

9. The combination as in claim 8, wherein the second arm further includes a vertical slide surface and the balancing mass includes a second roller arranged to roll on the vertical slide surface.

10. The combination as in claim 1, further comprising a slide carrier which defines a rotatable slide guide, wherein the slide carrier is made of plastic.

11. A reciprocating stroke drive mechanism for use with a saw of the type having a housing, a slide, a saw blade selectively fastened to said slide, a motor having a shaft, and a connecting link which is driven eccentrically by the shaft for vertically reciprocating the slide, said reciprocating stroke drive mechanism comprising:

a balancing mass which is slidable with the slide; and a pivotally mounted fork having a first arm and a second arm, the first arm adapted to contact the saw blade, the second arm including a slide surface which is inclined relative to the horizontal along which the balancing mass slides for horizontally reciprocating the saw blade while exerting a downward-directed vertical pressure.

12. The reciprocating stroke drive mechanism as in claim 11, wherein the pivot axis of the pivotally mounted fork is located at a location such that the first arm and the second arms have the same length.

13. The reciprocating stroke drive mechanism as in claim 11, wherein the fork has a recess, the reciprocating stroke drive mechanism further comprising a stop mounted eccentrically relative to the recess so that pivotal motion of the fork is restricted by contact with the stop.

14. The reciprocating stroke drive mechanism as in claim 13, further comprising a knob connected to the stop, the knob being for adjusting the stop and thereby setting the reciprocating stroke length of the saw blade.

15. The reciprocating stroke drive mechanism as in claim 11, wherein the fork has a rest position and the second arm of the fork has an opening in the slide surface, the balancing mass passing unhindered through the opening when the fork is in the rest position, whereby there is no horizontal reciprocation of the saw blade.

16. The reciprocating stroke drive mechanism as in claim 11, wherein the balancing mass is adapted to be slidably guided within the housing.

17. The reciprocating stroke drive mechanism as in claim 11, wherein the first arm has a support roller adapted to rest against the saw blade of the saw.

18. The reciprocating stroke drive mechanism as in claim 11, wherein the balancing mass includes a first roller arranged to roll on the inclined slide surface.

19. The reciprocating stroke drive mechanism as in claim 18, wherein the second arm further includes a vertical slide surface and the balancing mass includes a second roller arranged to roll on the vertical slide surface.

* * * * *